(12) United States Patent
Parker et al.

(10) Patent No.: US 7,712,842 B2
(45) Date of Patent: May 11, 2010

(54) WHEEL HAVING HUBCAP CLAMP MOUNTED TO IMPROVE WHEEL BALANCE AND METHOD OF BALANCING A WHEEL USING A HUBCAP CLAMP

(75) Inventors: Charles A. Parker, Granger, IN (US); Matthew D. Spray, South Bend, IN (US); David D. McAfee, Niles, MI (US); Andrew S. Haynes, New Carlisle, IN (US); Todd R. Auel, Granger, IN (US); Steve Hodge, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 76 days.

(21) Appl. No.: 11/589,191

(22) Filed: Oct. 30, 2006

(65) Prior Publication Data

US 2008/0100128 A1    May 1, 2008

(51) Int. Cl.
*B60B 7/00* (2006.01)
(52) U.S. Cl. .................................... 301/108.1
(58) Field of Classification Search .............. 301/108.1, 301/108.2, 108.3, 108.4, 108.5; 285/406, 285/407, 410
See application file for complete search history.

(56) References Cited

U.S. PATENT DOCUMENTS

| | | | | |
|---|---|---|---|---|
| 292,306 A | * | 1/1884 | Hawley | 285/328 |
| 1,954,140 A | | 4/1934 | Lyon | |
| 2,526,470 A | * | 10/1950 | Gauthier | 403/46 |
| 4,270,805 A | * | 6/1981 | Spisak | 301/37.35 |
| 4,447,092 A | | 5/1984 | Beisch et al. | |
| 4,470,638 A | | 9/1984 | Bartylla | |
| 5,020,861 A | | 6/1991 | Gorges | |
| 5,303,800 A | * | 4/1994 | Persson | 184/5.1 |
| 6,758,531 B1 | * | 7/2004 | Bullard | 301/37.21 |
| 2003/0038531 A1 | * | 2/2003 | Polka | 301/108.1 |
| 2004/0160115 A1 | * | 8/2004 | Allsop | 301/108.1 |
| 2006/0208560 A1 | * | 9/2006 | Allsop | 301/108.1 |
| 2008/0164750 A1 | * | 7/2008 | Vanetta | 301/5.21 |

FOREIGN PATENT DOCUMENTS

| | | | | |
|---|---|---|---|---|
| GB | 2031816 A | * | 4/1980 | |
| JP | 03032903 A | * | 2/1991 | |

* cited by examiner

*Primary Examiner*—S. Joseph Morano
*Assistant Examiner*—Kip T Kotter
(74) *Attorney, Agent, or Firm*—Birch, Stewart, Kolasch & Birch, LLP

(57) ABSTRACT

A method of mounting a hubcap on a wheel that involves providing a wheel having an annular hub surrounding an axis of rotation, the hub including a first periphery extending along the circumference of a circle surrounding the axis of rotation and a second periphery spaced from the circumference of the circle, providing a hubcap having a top wall and a cylindrical sidewall extending from the top wall, the cylindrical sidewall having an end edge spaced from the top wall and a circumferential flange projecting from the cylindrical sidewall, the circumferential flange having a sidewall and an alignment tab projecting from the sidewall, aligning the hubcap alignment tab with the second periphery, placing the hubcap sidewall against the hub and the alignment tab over the second periphery, and clamping the hubcap to the wheel. Also a wheel (10, 80) including a hubcap (30, 90) and a clamp (50).

18 Claims, 5 Drawing Sheets

WHEEL HAVING HUBCAP CLAMP MOUNTED TO IMPROVE WHEEL BALANCE AND METHOD OF BALANCING A WHEEL USING A HUBCAP CLAMP

FIELD OF THE INVENTION

The present invention is directed to a wheel having a hubcap connected thereto by a clamp and to a method of clamping a hubcap to a wheel, and, more specifically, toward a wheel having a hubcap clamp mounted in a manner that improves wheel balance and toward a method of positioning a hubcap and clamp to improve wheel balance.

BACKGROUND OF THE INVENTION

A wheel having a uniform distribution of mass will spin evenly and can be referred to as balanced. If the mass is not evenly distributed, the wheel will tend to vibrate and/or wobble at high rates of rotation. Many wheels, including aircraft wheels, have mass variations caused by the manufacturing process, or by valves or other elements on the wheel that make the distribution of mass on the wheel asymmetric. Wheels are therefore often balanced by adding small weights thereto to compensate for such asymmetries.

Aircraft wheels may include inflation and safety relief valves that tend to make the distribution of weight uneven. Thus, weights may be added to these wheels during the balancing process to counterbalance the mass of the valves. A tire pressure indicator system (TPIS) may also be added to an aircraft wheel after it is balanced. To offset the mass of the TPIS, counterweights are often provided with the TPIS that can be installed opposite the TPIS to substantially maintain wheel balance. Thus a wheel with an inflation valve, a safety valve, a TPIS and a TPIS counterweight is relatively evenly balanced.

A hubcap may be installed on the wheel after balancing. The mass distribution of hubcap itself can be estimated, and it is known to control the orientation of the hubcap with respect to the wheel. As illustrated in FIG. 14, a hubcap 200 may be provided with projecting pins 202 on a flange 204 which pins are received in openings 206 on a wheel flange 208 to ensure that the hubcap 200 is mounted in a desired angular relationship with the wheel 210. However, it has been found that the openings 206 in the wheel flange can concentrate stress in an undesirable manner, and it would be beneficial to eliminate such openings.

Moreover, the clamp (not illustrated in FIG. 14) used to attach the hubcap to the wheel does not have a symmetric mass distribution. Instead, the closure portion of the clamp has more mass than other portions of the clamp. Installing such a clamp on a wheel therefore reduces the balance of the wheel. And, because the clamp can be installed with the closure mechanism in any orientation, the effect of the clamp on the balance of a wheel is difficult to predict.

It is generally desirable to reduce the weight of aircraft components. It would therefore be desirable to reduce the number of weights required to balance an aircraft wheel and to reduce the imbalance imparted to an aircraft wheel by an asymmetrical hubcap clamp.

SUMMARY OF THE INVENTION

These and other problems are addressed by the present invention, a first aspect of which is a method of mounting a hubcap on a wheel that has an axis of rotation, an annular hub surrounding the axis of rotation, and an annular web projecting from the annular hub toward a wheel outer periphery. The wheel hub includes a first periphery extending along the circumference of a circle surrounding the axis of rotation and a second periphery spaced from the circumference of the circle. A hubcap is provided that has a top wall and a cylindrical sidewall extending from the top wall, and the cylindrical sidewall has an end edge spaced from the top wall and a circumferential flange projecting from the cylindrical side wall. The circumferential flange in turn has a sidewall and an alignment tab projecting from the sidewall. The hubcap alignment tab is aligned with the second periphery, the hubcap sidewall is placed against the hub with the alignment tab over the second periphery, and the hubcap is clamped to the wheel.

Another aspect of the invention is a wheel having an axis of rotation, a cylindrical hub surrounding the axis of rotation, and an annular web projecting from the cylindrical hub toward a wheel outer periphery. The cylindrical hub includes a first periphery extending along the circumference of a circle surrounding the axis of rotation and a second periphery spaced from the circumference of the circle. The wheel also includes a hubcap having a top wall and a cylindrical side wall extending from the top wall, and the cylindrical sidewall has an end edge spaced from the top wall and a circumferential flange projecting from the cylindrical side wall. The circumferential flange includes an alignment tab overlying the hub second periphery. A clamp is mounted around the hub and the hubcap circumferential flange to hold the hubcap on the wheel, the clamp includes a gap, and the tab is received in the gap.

A further aspect of the invention comprises a wheel having an axis of rotation, a cylindrical hub surrounding the axis of rotation and an annular web projecting from the cylindrical hub toward a wheel outer periphery. A hub flange is spaced from the annular web and projects away from the axis of rotation. The hub flange includes a projecting tab. A hubcap for mounting on the wheel has a top wall and a cylindrical side wall extending from the top wall. The cylindrical sidewall has an end edge spaced from the top wall and a circumferential flange projecting from the cylindrical side wall. The circumferential flange, in turn, has a first periphery extending along the circumference of a circle and a second periphery spaced from the circumference of the circle. The projecting tab is aligned with the hubcap second periphery when the hubcap is mounted on the wheel. A clamp is also provided that encircles the hub flange and the hubcap circumferential flange to hold the hubcap on the wheel. The clamp has a gap in which the tab is received.

BRIEF DESCRIPTION OF THE DRAWINGS

These and other aspects and features of embodiments of the present invention will be better understood after reading the following detailed description in connection with the attached drawings wherein.

DETAILED DESCRIPTION

Figure 1:
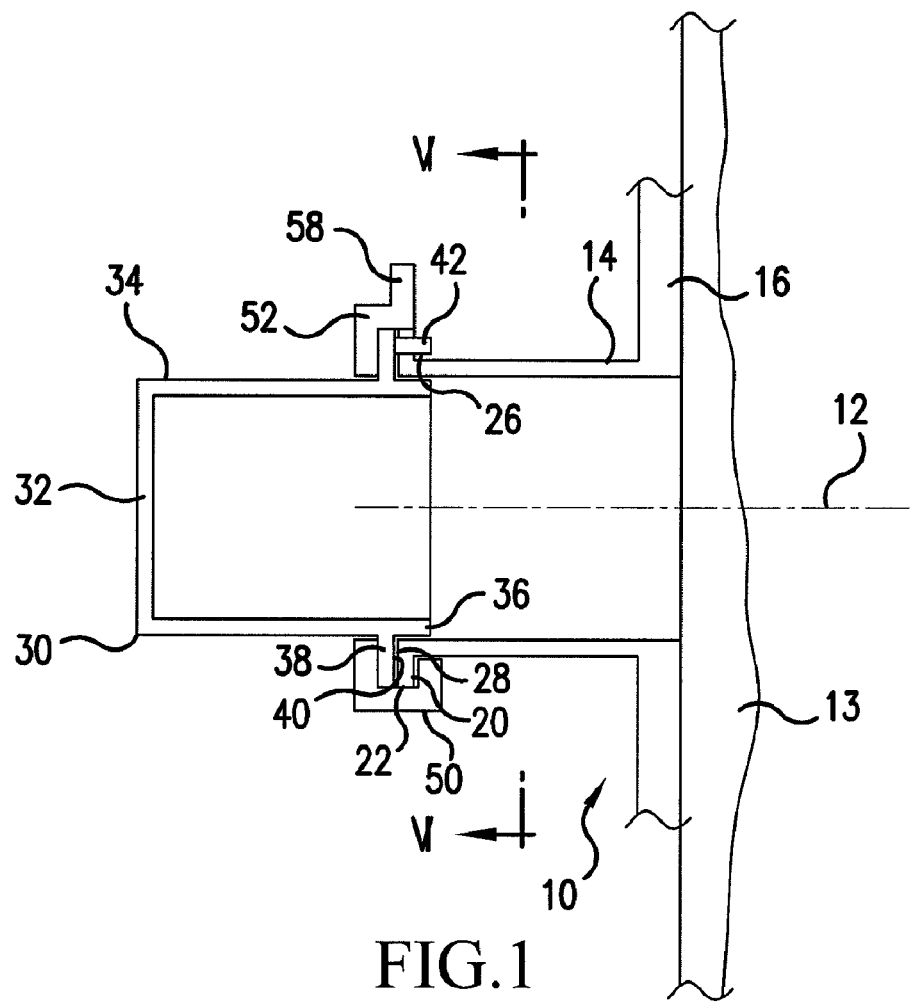
FIG. 1 is a sectional elevational view of a wheel having a hubcap according to an embodiment of the present invention.
Figure 3:
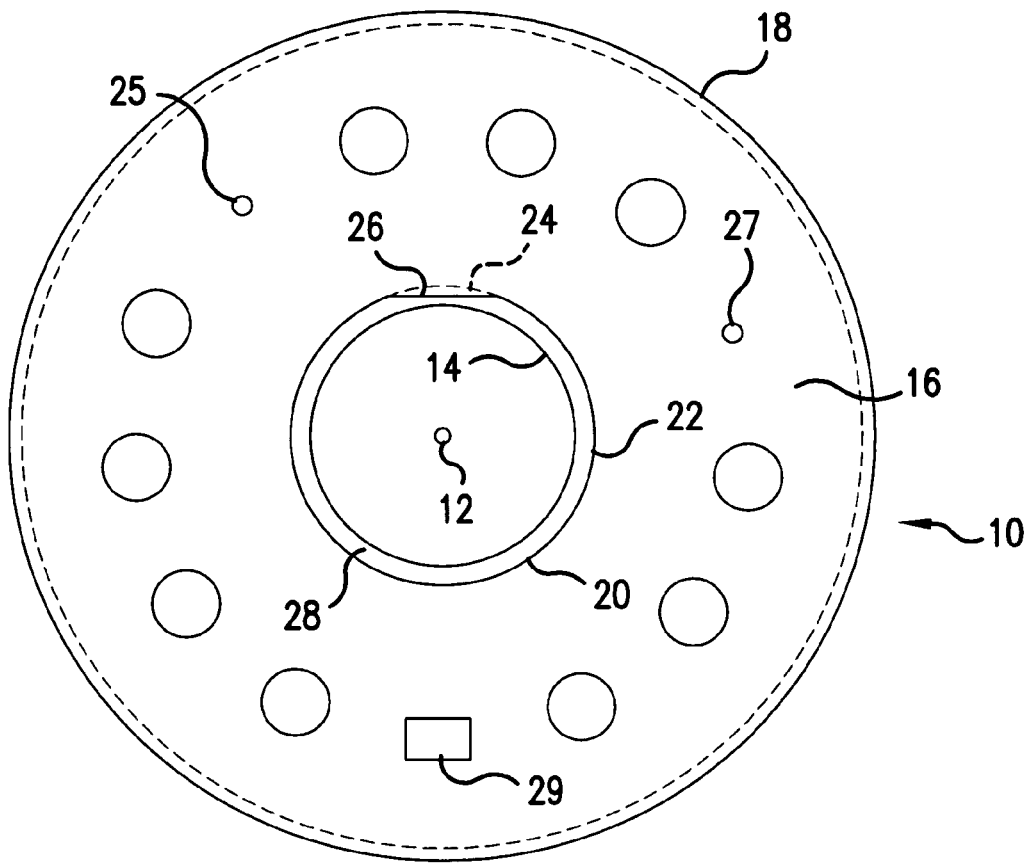
FIG. 3 is a front elevational view of the wheel of FIG. 1 with the hubcap removed.

Referring now to the drawings, wherein the showings are for purposes of illustrating preferred embodiments of the invention only, and not for the purpose of limiting same, FIGS. 1 and 3 illustrate a wheel 10 having an axis of rotation 12 and a hub 14 surrounding the axis of rotation 12. An annular web 16 extends from the hub 14 toward a wheel outer periphery 13 and forms the main body of wheel 10. A rim 18 at the outer edge of annular web 16 is illustrated in FIG. 3. Hub 14 includes a hub flange 20 that is spaced from annular web 16 and which extends away from the axis of rotation 12. Hub flange 20 has a generally circular periphery, specifically a first peripheral portion 22 that lies on a circle 24 surrounding axis of rotation 12 and a second peripheral portion 26 that is spaced from the circle. In this embodiment, second periphery 26 is flat or linear and lies along a chord of circle 24. Hub flange 20 also includes a first sidewall 28 facing away from annular web 16. An inflation valve is mountable at opening 25, a safety relief valve is mountable at opening 27, and a TPIS is mountable at location 29.

Figure 2:
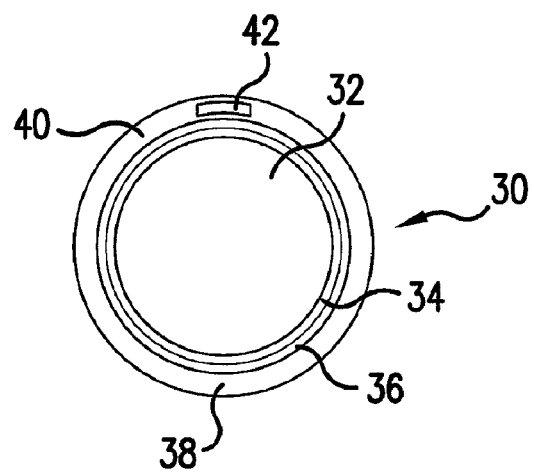
FIG. 2 is an end elevational view of the hubcap of FIG. 1.
Figure 11:
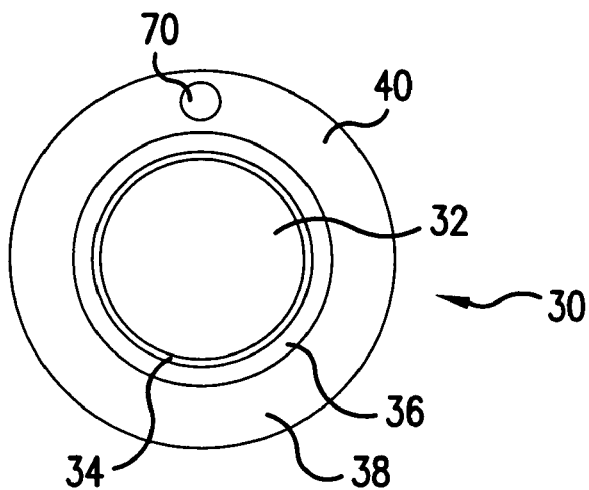
FIG. 11 is an end elevational view of an alternate hubcap usable with the wheel illustrated in FIG. 3.

FIGS. 1 and 2 illustrate a hubcap 30 having a top wall 32 and a sidewall 34 extending from the top wall and terminating at an end edge 36. A circumferential flange 38 projects from the sidewall 34 and includes a sidewall 40; an alignment tab 42 projects from sidewall 40. Alignment tab 42 is not limited to having a rectangular cross section; an alternate configuration of an alignment tab 70, usable with the wheel of FIG. 3, is illustrated in FIG. 11. Alignment tab 70 in this configuration has a circular cross section.

Figures 4, 5:
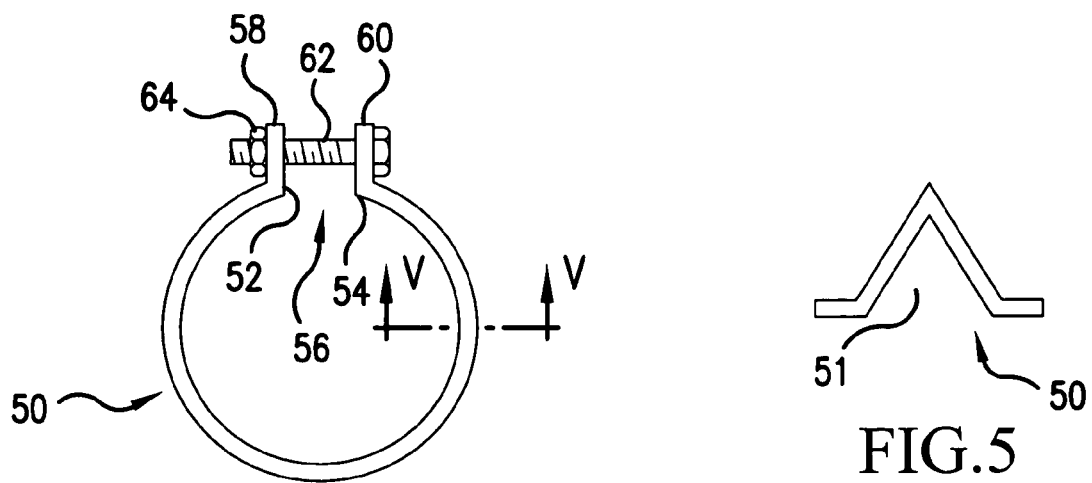
FIG. 4 is a side elevational view of a clamp for holding the hubcap of FIG. 1 on a wheel.
FIG. 5 is a sectional elevational view taken along line V-V of FIG. 4.

FIGS. 4 and 5 illustrate a clamp 50 for holding hubcap 30 on wheel 10. Clamp 50 is generally circular and has a V-shaped cross section forming a groove 51 as illustrated in FIG. 5. Clamp 50 has first and second ends 52, 54 that are normally spaced by a gap 56, and first and second fingers 58, 60, projecting from first and second ends 52, 54, respectively. A threaded fastener 62 passes through each of first and second fingers 58, 60 and a nut 64 is tightened on threaded fastener 62 to draw first and second ends 52, 54 toward one another and thereby reduce size of gap 56 and the diameter of the clamp 50.

Figure 6:
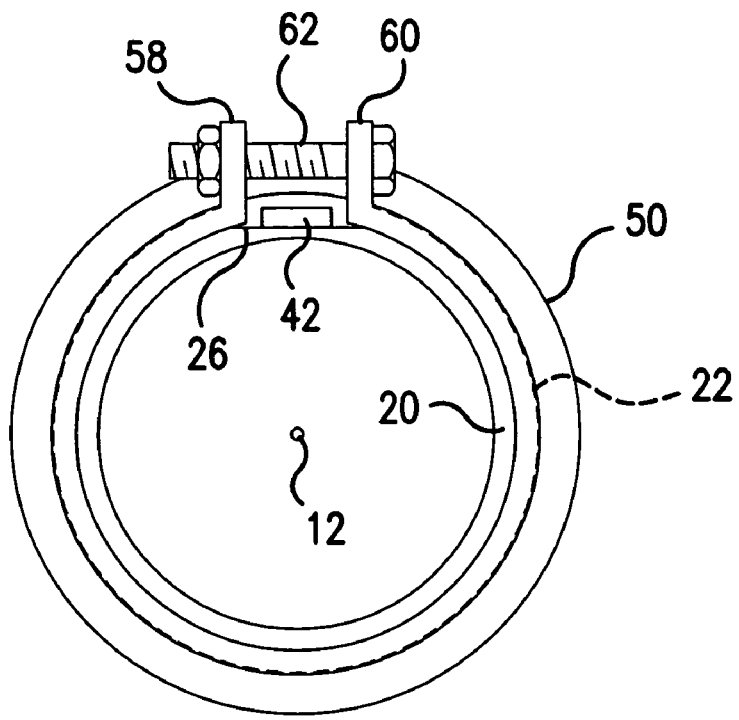
FIG. 6 is a sectional elevational view taken in the direction of line VI-VI in FIG. 1.
Figure 14:
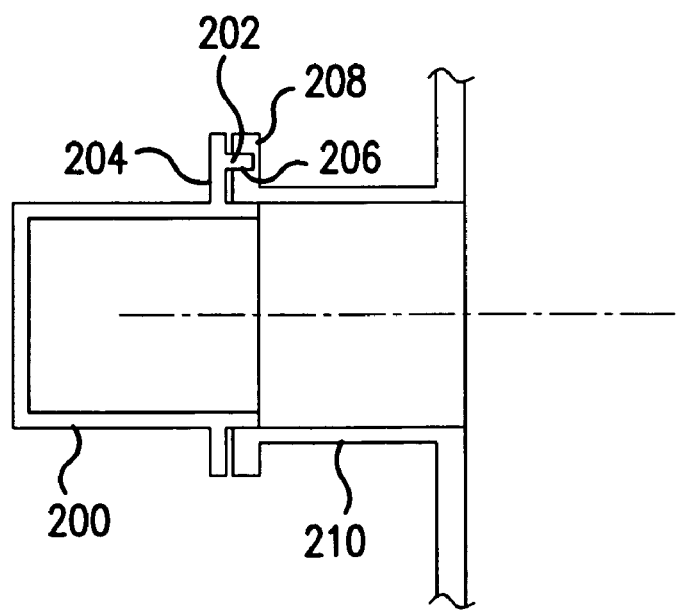
FIG. 14 is a sectional elevational view of a conventional hubcap and wheel.

As will be appreciated from FIG. 6, alignment tab 42 is configured and positioned such that sidewall 40 of hubcap 30 cannot be brought into contact with first sidewall 28 of wheel 10 over its full circumference unless alignment tab 42 is aligned with the second periphery 26 of wheel hub 14. In any other angular relationship, alignment tab 42 will contact wheel hub sidewall 28 and prevent hubcap 30 from being secured to wheel 10 in a proper manner. In this manner, a desired orientation between the hubcap 30 and wheel 10 can be obtained without the use of projecting pins and bores in the hub flange as was previously often necessary. With hubcap 30 held against wheel hub 14, clamp 50 is placed around the perimeters of hubcap circumferential flange 38 and hub flange 20 so that portions of the circumferential flange 38 and hub flange 20 are received in groove 51. The gap 56 of clamp 50 must be aligned with tab 42 for the clamp 50 to fit properly around the hubcap 30; the alignment tab 42 will help prevent clamp 50 from being attached to hubcap 30 properly if not aligned in this manner. Nut 64 and threaded fastener 62 are then tightened to draw the first and second ends 52, 54 of clamp 50 toward one another to reduce the size of gap 56, reduce the diameter or opening size of clamp 50 and to secure hubcap 30 to wheel hub 14. The length of threaded fastener may be selected so that threaded fastener 62 is not long enough to connect the first and second ends 52, 54 of the clamp if the clamp is not positioned with tab 42 in gap 56.

Generally, TPIS counterweights are installed at a position opposed to location 29 to balance the mass of the TPIS. The later addition of the hubcap clamp with threaded fastener 62, however, then unbalances the wheel to a certain degree. The present inventors have determined that the asymmetric mass of the hubcap clamp threaded fastener 62 can be used to adequately balance the mass of the TPIS without the need for additional TPIS balancing weights if the fastener is installed at a known location with respect to the TPIS. This arrangement results in a lower mass for the wheel and therefore contributes to fuel savings. The mass and placement of the inflation valve at location 25 and the safety valve at location 27 and the asymmetric mass of the hubcap can also be taken into account in a well known manner when determining the position for the hubcap clamp.

Figure 7:
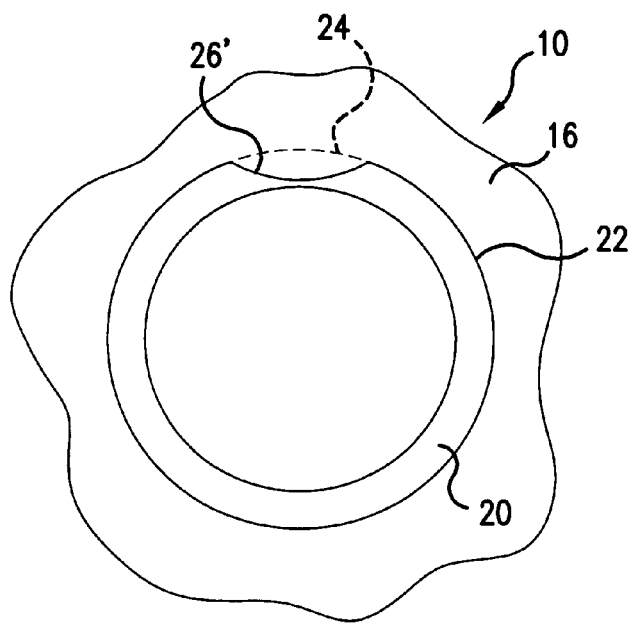
FIG. 7 is an elevational view of a hub flange of a wheel according to a second embodiment of the present invention.
Figure 8:
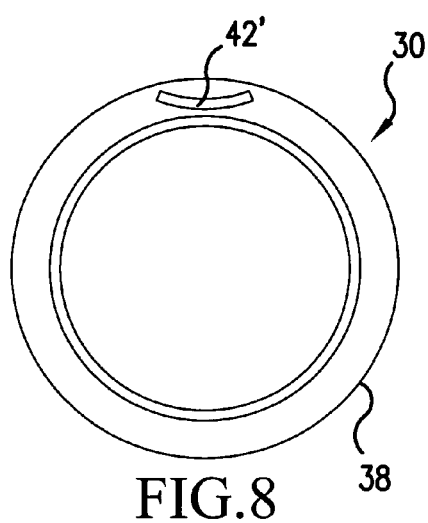
FIG. 8 is an end elevational view of a hubcap usable with the wheel of FIG. 7.

A second embodiment of the invention is illustrated in FIGS. 7 and 8, wherein like reference numerals are used to identify elements common to the first embodiment, and elements different than but related to elements of the first embodiment are identified with like references numerals and primes. In this embodiment, the second periphery 26' of wheel hub flange 20 is arcuate and cooperates with an arcuate alignment tab 42' on hubcap 30 of FIG. 8.

Figure 9:
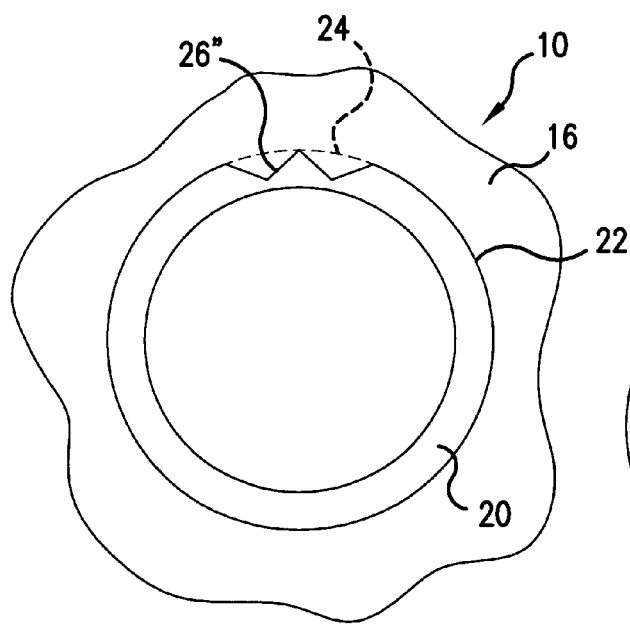
FIG. 9 is an elevational view of a hub flange of a wheel according to a third embodiment of the present invention.
Figure 10:
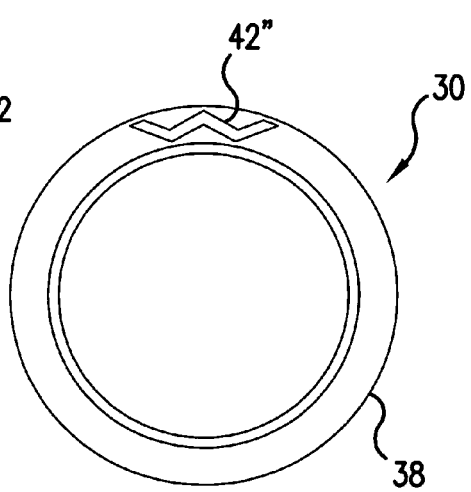
FIG. 10 is an end elevational view of a hubcap usable with the wheel of FIG. 9.

FIG. 9 illustrates a third embodiment of the invention wherein like reference numerals are used to identify elements common to the first embodiment, and elements different than but related to elements of the first embodiment are identified with like references numerals and double primes. In this embodiment, a W-shaped second periphery 26" cooperates with a W-shaped alignment tab 42" to ensure a desired alignment between the hub flange 20 and the hubcap 30. Other second peripheries having shapes complimentary to the shape of a hubcap alignment tab could be used without exceeding the scope of this invention.

Figure 12:
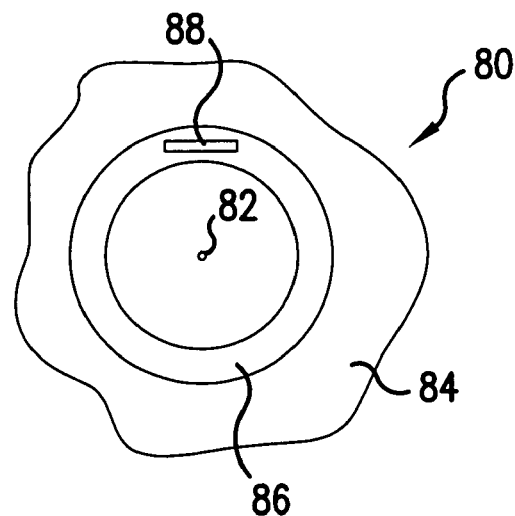
FIG. 12 is an elevational view of a wheel having a projecting tab according to a further embodiment of the present invention.
Figure 13:
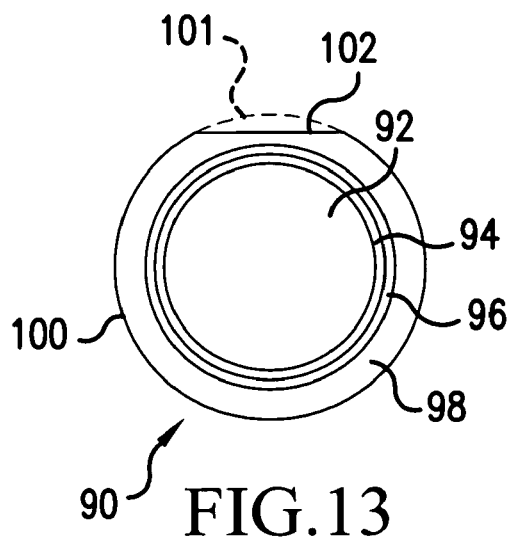
FIG. 13 is an end elevational a hubcap usable with the wheel of FIG. 12.

As described hereinabove, an alignment tab is formed on a hubcap while an aircraft wheel is provided with a peripheral portion that accommodates the tab on the hubcap. However, the present invention can also be practiced with an alignment tab on a wheel and a suitable hubcap having a portion alignable with the tab. With reference to FIG. 12, a wheel 80 includes an axis of rotation 82, a projecting web 84, a hub 85 and a hub flange 86, the hub flange 86 provided with a projecting alignment tab 88. A hubcap 90, illustrated in FIG. 13, includes a top wall 92, a sidewall 94 terminating in an end edge 96 and a circumferential flange 98. Circumferential flange 98 has a first peripheral portion 100 overlying a circle 101 and a second peripheral portion 102 spaced from the circle 101. In FIG. 13, second portion 102 is linear. In this embodiment, hubcap 90 must be positioned so that second peripheral portion 102 is aligned with projecting tab 88 on hub flange 86 in order for the hubcap 90 to be installed.

Hubcap 90 is clamped to wheel 80 with tab 88 located in the gap of a clamp (not shown) in the same manner as the previously described embodiments.

The present invention has been described herein in terms of several presently preferred embodiments. Obvious additions and modifications to these embodiments will become apparent to those skilled in the relevant art upon a reading of the foregoing disclosure. It is intended that all such obvious additions and modifications form a part of the present invention to the extent they fall within the scope of the several claims appended hereto.

We claim:

1. A wheel and hubcap assembly comprising:
    an axis of rotation;
    a cylindrical hub surrounding the axis of rotation and including a hub flange projecting from the hub; and
    an annular web projecting from the cylindrical hub toward a wheel outer periphery and spaced from the hub flange;
    a utility device having a predetermined weight at a predetermined location on the annular web of the wheel after the wheel is substantially balanced;
    the cylindrical hub including a first periphery extending along the circumference of a circle surrounding the axis of rotation and a second periphery spaced from the circumference of the circle;
    a hubcap having a top wall and a cylindrical side wall extending from said top wall, the cylindrical sidewall having an end edge spaced from the top wall and a circumferential flange projecting from the cylindrical side wall, the circumferential flange further including an alignment tab overlying the hub second periphery; and
    a clamp having an asymmetric mass distribution around the hub and the hubcap circumferential flange holding the hubcap on the wheel, the clamp including a gap and a groove, the groove to receive the circumferential flange of the hubcap and the hub flange and the tab being received in the gap, the clamp including a closure element for adjusting a diameter of the clamp and counterweighing the utility device to rebalance the wheel based on a predetermined placement of the closure element with respect to the utility device, the predetermined location of the utility device on the annular web of the wheel and the predetermined weight of the utility device.

2. The wheel of claim 1 wherein said first periphery and said second periphery are located on said hub flange.

3. The wheel of claim 2 wherein
    said hub flange includes a first sidewall and the hubcap circumferential flange includes a second sidewall contacting said first sidewall.

4. The wheel of claim 2 wherein said second periphery is linear.

5. The wheel of claim 2 wherein said second periphery is concave.

6. The wheel of claim 2 wherein said utility device is mounted on said wheel opposed to said second periphery.

7. The wheel of claim 2 wherein said utility device is a pressure sensor mounted on said wheel opposed to said second periphery.

8. The wheel of claim 2 wherein said element having a mass and wherein the angular relationship between said closure element and said predetermined weight of the utility device is selected to at least partially balance the wheel.

9. The wheel of claim 2 wherein the angular relationship between said second periphery and said predetermined weight of the utility device is selected so that the closure element at least partially balances the predetermined weight of the utility device.

10. The wheel of claim 2 wherein the location of the second periphery is selected to allow the closure element to at least partially balance the wheel.

11. A method of mounting a hubcap on a wheel comprising the steps of:
    providing a wheel having an axis of rotation, an annular hub surrounding the axis of rotation and including an annular hub flange projecting from the hub, and an annular web projecting from the annular hub toward a wheel outer periphery and spaced from the annular hub flange, the hub including a first periphery extending along the circumference of a circle surrounding the axis of rotation and a second periphery spaced from the circumference of the circle;
    providing a utility device having a predetermined weight at a predetermined location on the annular web of the wheel after the wheel is substantially balanced;
    providing a hubcap having a top wall and a cylindrical sidewall extending from the top wall, the cylindrical sidewall having an end edge spaced from the top wall and a circumferential flange projecting from the cylindrical side wall, the circumferential flange having a sidewall and an alignment tab projecting from the sidewall;
    aligning the hubcap alignment tab with the second periphery;
    placing the hubcap sidewall against the hub and the alignment tab over the second periphery; and
    clamping the hubcap to the wheel using a clamp having an asymmetric mass distribution, the clamp including a closure element for adjusting a diameter of the clamp and counterweighing the utility device to rebalance the wheel based on a predetermined placement of the closure element with respect to the utility device, the predetermined location of the utility device on the annular web of the wheel and the predetermined weight of the utility device, wherein the clamp receives the circumferential flange of the hubcap and the hub flange of the wheel.

12. The method of claim 11 wherein the first periphery and the second periphery are located on the hub flange and wherein said step of placing the hubcap circumferential flange sidewall against the hub comprises the step of placing the hubcap circumferential sidewall against the hub flange.

13. The method of claim 12 wherein the hub flange includes a sidewall and said step of placing the hubcap circumferential flange sidewall against the hub flange comprises the step of placing the hubcap circumferential flange sidewall against the hub flange sidewall.

14. The method of claim 12 wherein the hubcap circumferential flange is spaced from the end edge and said step of placing the hubcap circumferential flange sidewall against the hub flange sidewall comprises the step of inserting the end edge into the hub.

15. The method of claim 12 wherein said step of clamping the hubcap to the wheel comprises the steps of:
    providing a clamp having first and second ends and the closure element for drawing the first end toward the second end;
    placing the clamp around the hubcap circumferential flange and the wheel hub flange with the alignment tab between the clamp first end and the clamp second end, and
    operating the closure element to draw the first end toward the second end.

16. The method of claim 12 wherein said step of clamping the hubcap to the wheel comprises the steps of:
  providing a circular clamp having a gap and the closure element for reducing the diameter of the clamp;
  placing the clamp around the hubcap circumferential flange and the wheel hub flange with the alignment tab in the gap, and
  operating the closure element to reduce the diameter of the clamp.

17. The method of claim 16 wherein said step of operating the closure element to reduce the diameter of the clamp comprises operating the closure element to reduce the size of the gap.

18. The wheel of claim 11, wherein the clamp includes a first end and second end, the first and the second ends are connected by the closure element and the gap being located between the first and the second ends.

* * * * *